United States Patent
Hersant et al.

(10) Patent No.: US 8,556,102 B2
(45) Date of Patent: Oct. 15, 2013

(54) SEALING PLUG

(75) Inventors: Carl Hersant, Hertford (GB); Andrew Roberts, Petenhall (GB); Jonathan Brewer, Dunstable (GB)

(73) Assignee: Avdel UK Limited, Welwyn Garden, Hertfordshire (GB)

(*) Notice: Subject to any disclaimer, the term of this patent is extended or adjusted under 35 U.S.C. 154(b) by 853 days.

(21) Appl. No.: 11/564,958

(22) Filed: Nov. 30, 2006

(65) Prior Publication Data
US 2008/0111373 A1 May 15, 2008

(30) Foreign Application Priority Data
Nov. 9, 2006 (GB) .................................. 0622304.4

(51) Int. Cl.
*B65D 53/00* (2006.01)
*F16B 13/04* (2006.01)

(52) U.S. Cl.
USPC ............. 220/235; 220/233; 220/236; 411/34; 411/43

(58) Field of Classification Search
USPC ............... 52/514; 411/34, 37, 43; 248/354.4, 248/354.3, 188; 220/233, 234, 235, 236, 220/237
See application file for complete search history.

(56) References Cited

U.S. PATENT DOCUMENTS

| | | | |
|---|---|---|---|
| 1,994,210 A | | 3/1935 | Chobert |
| 2,821,323 A | * | 1/1958 | Lee, II ........................... 220/233 |
| 3,835,615 A | | 9/1974 | King, Jr. |
| 3,837,522 A | * | 9/1974 | Lesnansky, Jr. ............... 220/235 |
| 4,390,042 A | * | 6/1983 | Kucherer et al. ............... 138/89 |
| 4,751,944 A | * | 6/1988 | Sinha et al. ..................... 138/89 |
| 4,789,283 A | * | 12/1988 | Crawford ........................ 411/43 |
| 4,865,080 A | * | 9/1989 | Lundquist ....................... 138/89 |
| 4,867,333 A | * | 9/1989 | Kolp et al. ..................... 220/234 |
| 4,982,763 A | * | 1/1991 | Klahn ............................. 138/89 |
| 5,078,294 A | * | 1/1992 | Staubli .......................... 220/233 |
| 5,345,734 A | * | 9/1994 | Tremblay .................... 52/204.52 |
| 5,779,085 A | * | 7/1998 | Havlinek et al. .............. 220/234 |
| 6,273,655 B1 | * | 8/2001 | McAlpine et al. ............... 411/34 |
| 6,852,380 B2 | * | 2/2005 | Tremblay ........................ 428/34 |
| 6,981,524 B2 | * | 1/2006 | Jorgensen ........................ 138/89 |
| 2004/0060248 A1 | * | 4/2004 | Tremblay .................... 52/204.52 |
| 2005/0008454 A1 | * | 1/2005 | Roberts ......................... 411/501 |
| 2005/0016510 A1 | * | 1/2005 | Olzinger et al. .............. 123/594 |
| 2006/0062650 A1 | * | 3/2006 | Keener ............................ 411/34 |
| 2009/0074538 A1 | * | 3/2009 | Richie ........................... 411/516 |

FOREIGN PATENT DOCUMENTS

| | | |
|---|---|---|
| CA | 2088027 | 7/1994 |
| FR | 2610386 | 2/1987 |
| GB | 594859 | 11/1947 |
| GB | 2094928 | 9/1982 |
| GB | 2314904 | 1/1998 |
| GB | 2362201 | 11/2001 |
| GB | 2 381 301 | 4/2003 |
| JP | 5-12727 | 2/1993 |

* cited by examiner

*Primary Examiner* — Ryan Kwiecinski
(74) *Attorney, Agent, or Firm* — Hahn, Loeser & Parks LLP; Arland T. Stein

(57) ABSTRACT

A sealing plug for sealing a hole in a wall, which sealing plug is insertable into the hole by access from only one side thereof, which sealing plug comprises:
  a radially expandable body which is radially expandable by access thereto from only one end thereof, and
  a sealing cap which covers the other end of the expandable body and extends therefrom along the exterior of the length of the body, the sealing cap being of a material which is fluid resistant;
whereby, when the sealing plug has been inserted in the hole and has been radially expanded so that at least part of the sealing cap adjacent the wall of the hole expands and engages therewith, the sealing cap is secured in the hole with the sealing cap sealing the plug body against access thereto from outside the cap.

9 Claims, 6 Drawing Sheets

SEALING PLUG

CROSS-REFERENCE TO RELATED APPLICATIONS

This application claims priority to Great Britain provisional patent application number 0622304.4 filed Nov. 9, 2006.

BACKGROUND AND SUMMARY

The invention relates to a sealing plug, for example for sealing a hole in the wall of a container for fluid. More particularly, the plug is insertable into the hole, and securable therein, by access only from the outside (i.e. the non fluid-containing side) of the wall. Plugs which are radially expandable into engagement with the surface of the hole are known, for example the type of plug described in GB 2 381 301 B and commercially available under the name AVSEAL II (AVSEAL is a Registered Trade Mark).

In order for the body of the plug to be sufficiently radially expandable in a ductile manner and to a certain extent axially deformable (as described in GB 2 381 301 B), it must be made of a material which is sufficiently soft, e.g. aluminium. However, this has the disadvantage that it restricts the range of fluids which can be contained in the container when its wall has thus been sealed, because the material of the plug body can be subject to attack from certain fluids, for example acids, effluent and some bio-fuels, or subject to erosion, for example via fluid cavitation, or abrasion.

It is an object of the present invention to overcome this disadvantage.

The present invention provides, in one of its aspects, a sealing plug for sealing a hole in a wall, which sealing plug is insertable into the hole by access from only one side thereof, which sealing plug comprises: a radially expandable body which is radially expandable by access thereto from only one end thereof, and a sealing cap which covers the other end of the expandable body and extends therefrom along the exterior of the length of the body, the sealing cap being of a material which is fluid resistant; whereby, when the sealing plug has been inserted in the hole and has been radially expanded so that at least part of the sealing cap adjacent the wall of the hole expands and engages therewith, the sealing cap is secured in the hole with the sealing cap sealing the plug body against access thereto from outside the cap.

BRIEF DESCRIPTION OF THE DRAWINGS

Embodiments of the invention will now be described by way of example, and with reference to the accompanying Figures (which are all axial sections unless otherwise specified), in which.

DETAILED DESCRIPTION OF THE DRAWINGS

Figure 1:
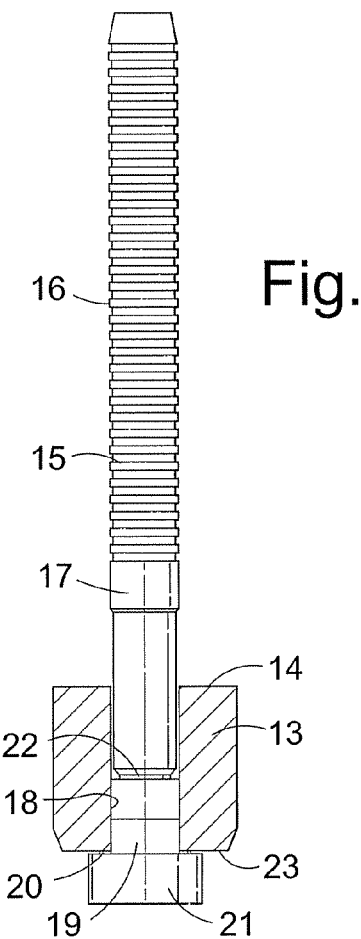
FIG. 1 shows a sealing plug comprising a radially expandable body assembled onto a stem and head for expanding it, but without its sealing cap.

The part of the sealing plug which is common to all of these examples is designed to seal a circular cross-section hole 11 in a steel wall 12 of a container for liquid or gas. The plug comprises a radially expandable body provided by a cylindrical shell 13. This shell is radially expandable by means of access to only the upper end of the shell, through which protrudes an elongated stem 15. The protruding part is provided with circumferential ridges and grooves 16 by means of which the stem can be engaged by the jaws 34 of an installation tool shown in FIGS. 4 and 6. The adjacent part 17 of the stem has no grooves, and extends into the bore 18 of the shell. It is connected to an integral head 19, 21 by means of a breakneck 22. The adjacent part 19 of the head lies within the shell bore, and the radially enlarged part 21 of the head lies below the lower end face 23 of the shell. The face of the part 21 which is adjacent the shell is formed with an axially projecting annular ridge 20 which contacts the lower end face 23 of the shell. The stem and head are made of steel, and the shell 13 is made of aluminium.

The plug so far described is commercially available under the trademark AVSEAL II, and its construction and use, and that of the corresponding installation tool, will be familiar to those skilled in the art.

The sealing plug of this example also comprises a cylindrical closed-end sealing cap 24 made of stainless steel. It has an internal cavity 25 of a diameter in which the shell 13 is a sliding fit. Its lower end 26 is closed, and its upper end 27 is open. The upper end is formed with an external protruding rim 28. In this example, the cap 24 is 14.5 mm in length, and of 0.25 mm thickness. The rim protrudes radially by approximately 0.5 mm.

Figure 3:
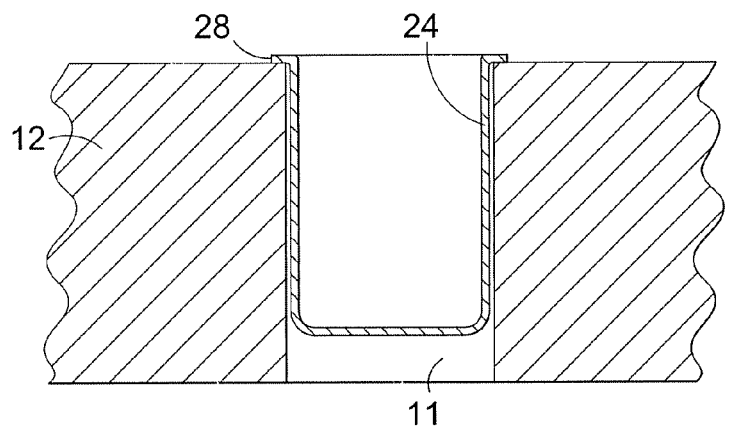
FIG. 3 shows the sealing cap inserted in a hole in a wall.
Figure 2:
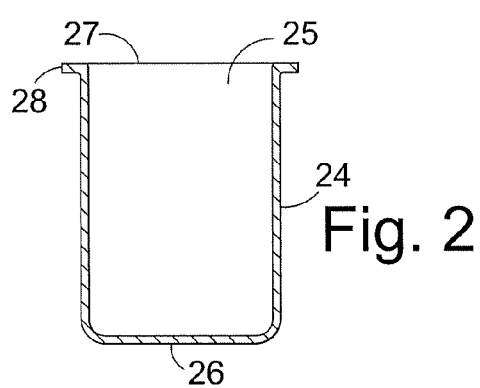
FIG. 2 shows an appropriate sealing cap.
Figure 4:
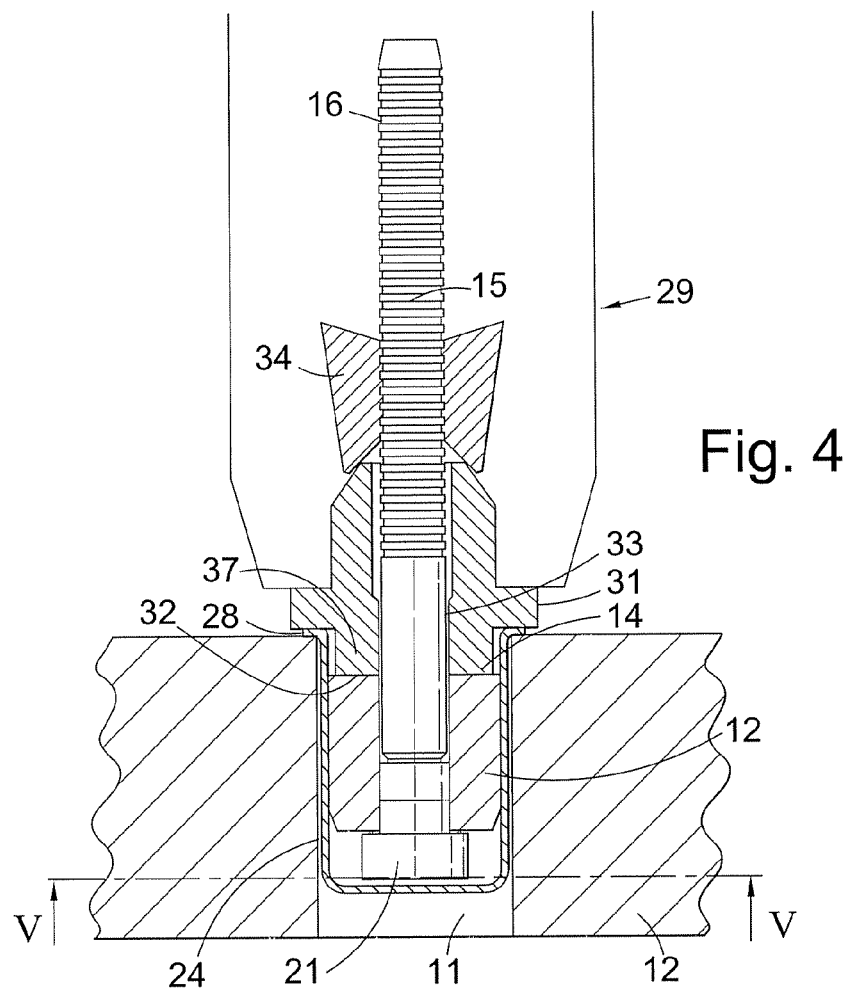
FIG. 4 shows the stem gripped by the nose jaws of a suitable installation tool, with the expandable body inserted in the sealing cap of FIG. 3.
Figure 5:
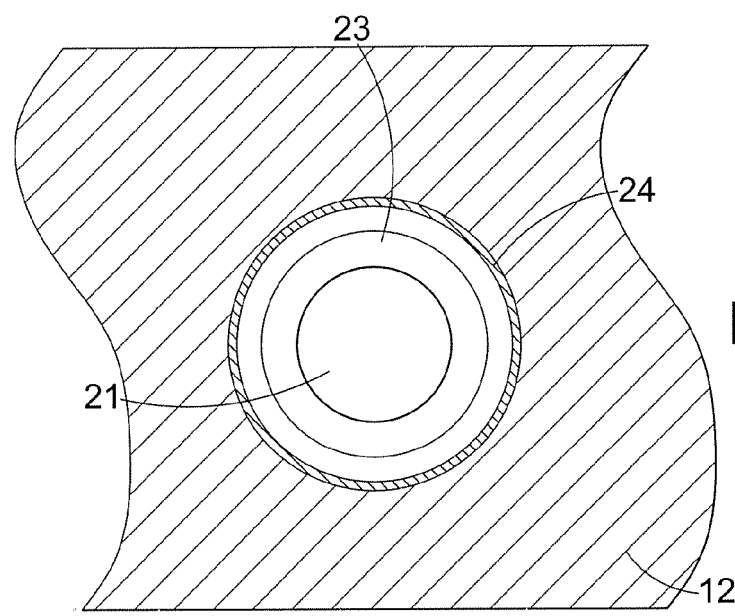
FIG. 5 is a cross-section on the line V-V of FIG. 4.

According to one example embodiment, the sealing cap 24 is first inserted into the hole 11 in the wall 12, as illustrated in FIGS. 3, 4 and 5. The cap is of appropriate external diameter to be a sliding fit in the hole 11, and is pushed into the hole from the outside thereof (the upper side in FIGS. 3, 4 and 5), until the rim 28 contacts the outside face of the wall, as shown in FIG. 3, which also shows that the length of the cap 24 is slightly less than the thickness of the wall 12, so that it does not protrude beyond the inside face of the wall.

Figure 6:
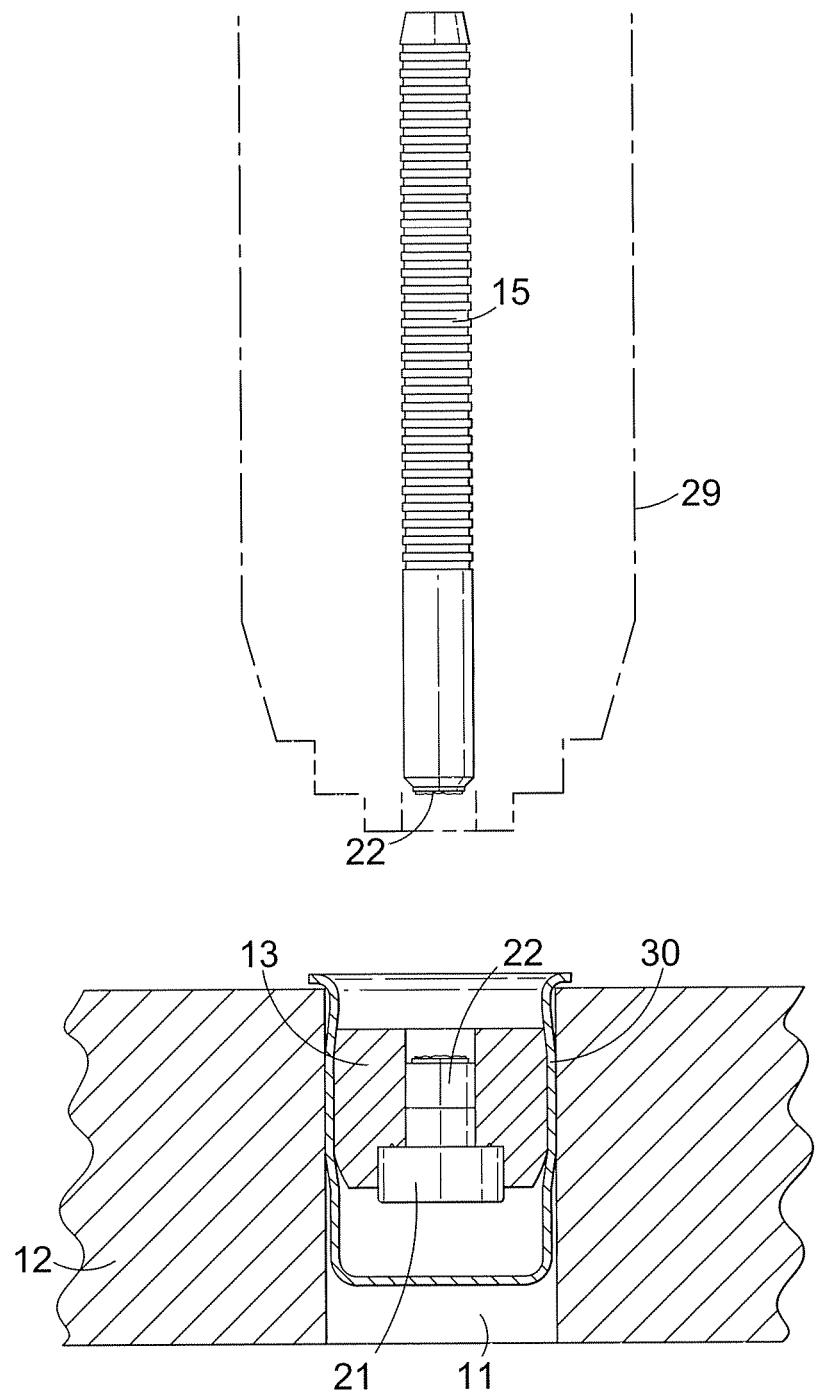
FIG. 6 is similar to FIG. 4 but shows the sealing plug after installation in the hole and the tool with the broken-off stem being withdrawn.

The sealing plug is used in conjunction with a hydro-pneumatic powered installation tool illustrated at 29 in FIGS. 4 and 6, the function and use of which is well understood by those skilled in the art. Briefly, it comprises an annular nose-piece 31 with a flat end face having a bore 33 to accept the stem 15 of the plug. The nosepiece contains jaws 34 which are separable to receive the ribbed part 16 of the stem and can be clamped onto it to engage the ribs and pull the stem with respect to the nosepiece. Its lower end face is provided with an integral axially projecting annular spigot 37 which is a clearance fit within the cap 24.

In use, the stem 15 is inserted into the tool until the end face of the spigot contacts the upper end face 14 of the shell 13, and the jaws 34 are then closed together to engage the stem. The tool is then moved so as to insert the shell 13 and stem head 21 into the cap 24 in the hole 12, until the tool nosepiece face 32 contacts the rim 28 at the upper end face of the cap. This is the position shown in FIG. 4. The tool is then actuated so as to retract the tool jaws 34 with respect to the nosepiece 31, with a progressively increasing force. This has the effect of pulling the stem head 21 to axially compress the shell 13 between the head 21 and the end face 32 of the spigot 37.

This causes the shell to contract axially and expand radially, thus pushing the adjacent part 30 of the cap radially outwardly into contact with the shell wall, as illustrated in FIG. 6. This has the effect of both sealing the hole against leakage of fluid along it, and of securely locking the sealing plug in the hole. The annular ridge 20 engages with the shell to resist radially outwards expansion of the lower end of the shell.

Increasing force exerted by the installation tool on the stem causes the stem to break at the breakneck 22, leaving the sealing plug securely locked in the hole, as illustrated in FIG. 6.

Figure 7:
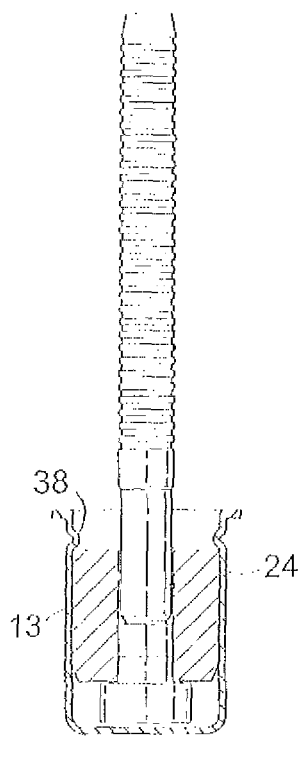
FIGS. 7 and 8 show two alternative forms of sealing plug.

According to a second example embodiment, the radially expandable body 13 is pre-assembled inside the sealing cap 24, as illustrated in FIG. 7. It is preferable to provide means for assisting in the retention of the sealing cap on the shell after assembly thereof, to enable handling of the assembled plug.

Figure 8:
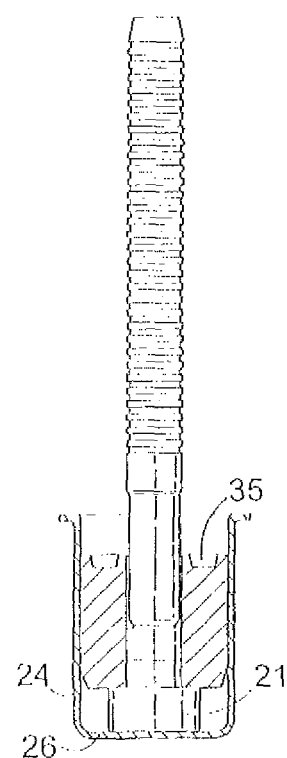

For example, this could be provided by a radially-inwards deformation of the sealing cap in the form of an annular deformation 38 above the shell 13, as illustrated in FIG. 7. An alternative is illustrated in FIG. 8, in which a local radial expansion of the plug sleeve at its upper end is achieved by a circular axial indentation 35 in the adjacent end face of the shell.

Figure 12:
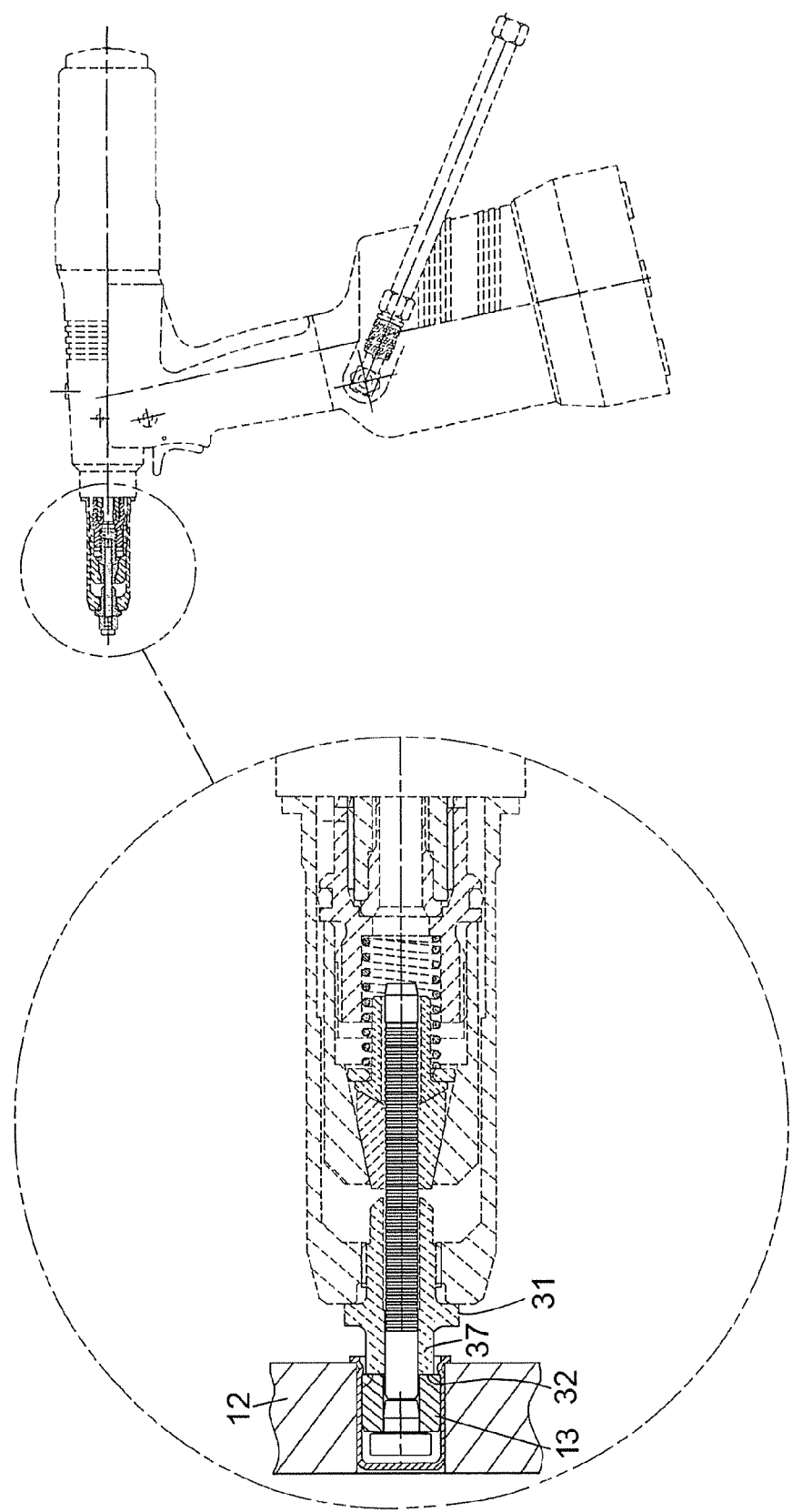
FIG. 12 is similar to FIG. 4 but illustrates the installation of the pre-assembled plug illustrated in FIG. 7.

The pre-assembled plug is engaged with the installation tool in a similar way to the first embodiment, and the plug is then inserted in the hole 11, as illustrated in FIG. 12. It will be noted that the lower end face 32 of the nosepiece 31 is spaced apart from the rim 28 of the cap 24, in order to allow some tolerance on the relative axial positions of the shell 13 and the cap 24. The cap rim 28 is held in contact with the top or outer face of the wall 12 by thrust applied to the plug through the tool. When the tool is actuated, it installs the plug in a similar manner to that described with reference to the first embodiment.

Figure 11:
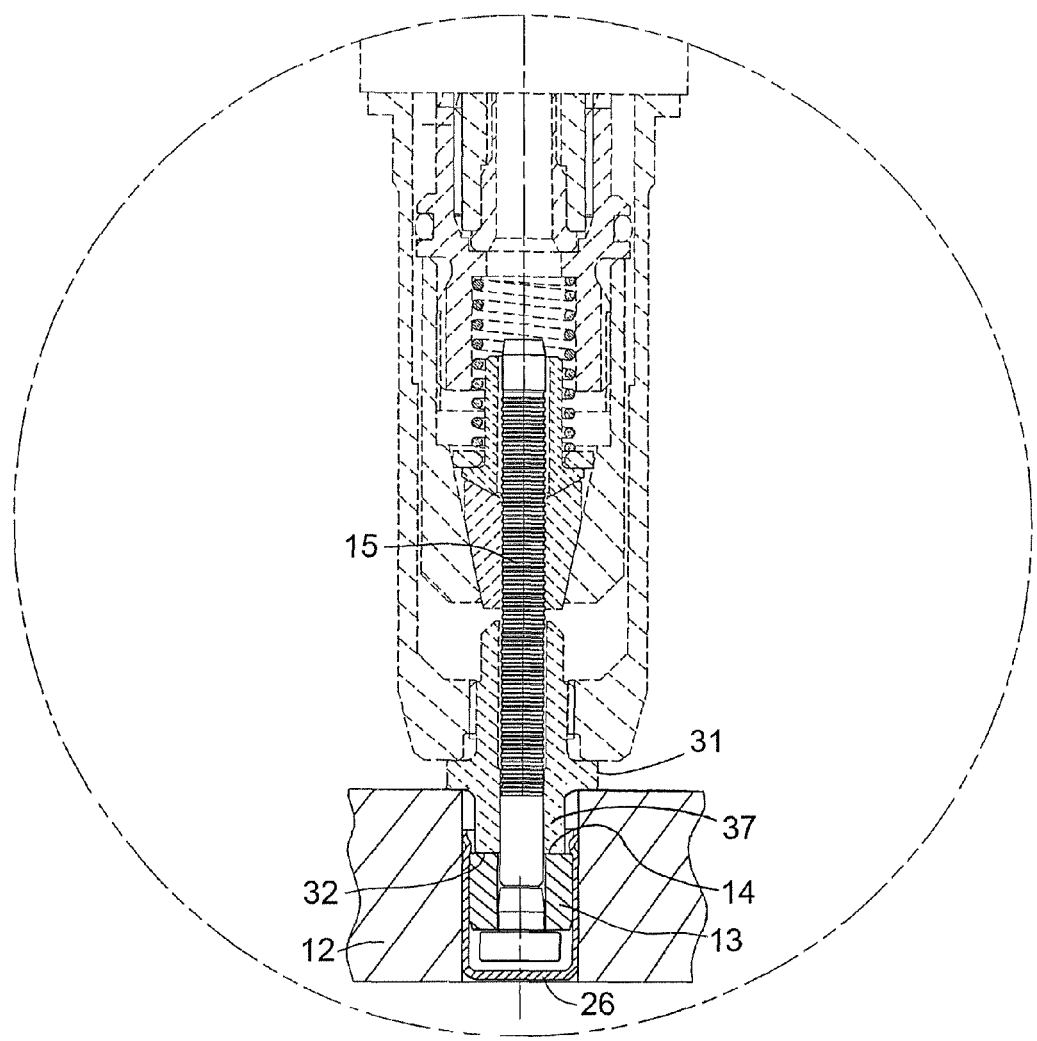
FIG. 11 is similar to FIG. 4 but shows a plug incorporating a cap without an external rim.

A further embodiment is illustrated in FIG. 11, in which the cap 24 has an external cross-section which is constant throughout its length, so that it has no external rim. Hence it can be inserted into the hole 11 to a greater depth. Its position is governed by the length of the nosepiece spigot 37. Thus the plug can be installed with its closed end face 26 substantially flush with the inner face of the wall 12. This allows high velocity fluid flow past it with minimal turbulence.

Figure 9:
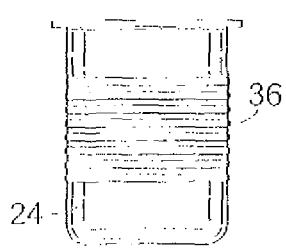
FIG. 9 is an external elevation.
Figure 10:
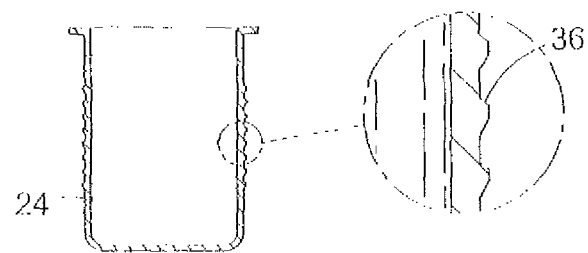
FIG. 10 is an axial section, of a modified form of sealing cap.

Another possible enhancement of the performance of the sealing plug would be to increase the strength of engagement of the cap with the hole wall, so as to increase even more the force needed to remove it. One embodiment of this is illustrated in FIGS. 9 and 10, in which the exterior face of the sealing cap 24 is formed with a number of circumferential ribs 36. As illustrated in the enlarged section of FIG. 10, these are preferably shaped asymmetrically, so as to provide a greater resistance to upwards removal when they engage into the hole wall when the seal is installed therein.

In the foregoing examples, the stainless steel cap 24 is of annealed stainless steel AISI 304 grade, with a hardness of Hv 150. The plug shell 13 is of annealed aluminium to AA 6061, with a hardness of Hv 40.

The embodiments of the invention as described above can provide several advantages in use. For instance, the cap can offer improved resistance to high temperatures. It can be more suitable for use with food-processing or medical applications. The harder cap resists axial scratches to the plug's external surface, e.g. when being handled, or inserted off-centre, or at an angle, into a hole. Such scratches might create leak paths. It avoids corrosion of the steel stem head used in the Avseal II. The externally ribbed version illustrated in FIGS. 9 and 10 can engage into soft substrates more positively than the Avseal II. This can give improved resistance to leakage in some instances, e.g. if the hole in which it is installed is not exactly cylindrical, e.g. slightly ovoid or tapered.

The invention is not restricted to the details of the foregoing examples. For instance, the cap could be made of some other suitable material such as titanium, or a hard copper alloy. The shell could be of soft copper or some other soft and ductile metal.

The invention claimed is:

1. A sealing plug for sealing a hole in a wall, which sealing plug is insertable into the hole by access from only one side thereof, which sealing plug comprises:
   a radially expandable body which is radially expandable by access thereto from only a first end thereof,
   a sealing cap which covers a second end of the expandable body and extends therefrom along the exterior of the length of the expandable body, the sealing cap being of a material which is fluid resistant; and
   retention-assisting means for retaining the sealing cap on the expandable body, wherein the retention-assisting means comprise an axial indentation of the first end of the expandable body that forms a local radial expansion of the expandable body into engagement with the sealing cap to retain the sealing cap on the expandable body;
   wherein a radial cross-section of the sealing plug proximate to the first end of the expandable body is no greater than a radial cross-section of the sealing cap proximate to the second end of the expandable body;
   whereby, when the sealing plug has been inserted in the hole and has been radially expanded so that at least part of the sealing cap adjacent the wall of the hole expands and engages therewith, the sealing cap is secured in the hole with the sealing cap sealing the expandable body against access thereto from outside the sealing cap.

2. A sealing plug as claimed in claim 1, inserted into a hole as aforesaid, which sealing plug has been assembled by first inserting the sealing cap into the hole, and then inserting the expandable body into the sealing cap.

3. A sealing plug as claimed in claim 1, which sealing plug has been assembled by inserting the expandable body into the sealing cap without, or before, inserting the sealing plug into the hole.

4. A sealing plug as claimed in claim 1, in which the axial indentation is circular.

5. A sealing plug as claimed in claim 1, in which the sealing cap is provided with at least one external circumferential projection, whereby to enhance engagement or sealing of the cap with the wall of the hole.

6. A sealing plug comprising:
   a radially expandable body having a first end and a second end;
   a stem protruding from the first end of the expandable body;
   a head protruding from the second end of the expandable body, the head connected to the stem by a breakneck,
   a sealing cap having a closed end that encloses the second end of the expandable body and the head, the sealing cap extending along the length of the expandable body to an open end configured to receive an annular spigot in contact with the first end of the expandable body, the sealing cap being fluid resistant; and retention-assisting means for retaining the sealing cap on the expandable body, wherein the retention-assisting means comprise an axial indentation of the first end of the expandable body that forms a local radial expansion of the expandable body into engagement with the sealing cap to retain the sealing cap on the expandable body;

wherein the expandable body is configured such that an axial force applied to the stem causes the expandable body to radially expand within the sealing cap from compression between the head and the spigot;

where the sealing plug is bound by a cylinder having a diameter no greater than a diameter of a radial cross-section of the sealing cap adjacent the second end of the expandable body.

7. The sealing plug as claimed in claim 6, where the axial indentation is a circular axial indentation.

8. The sealing plug as claimed in claim 6, where the sealing cap further comprises:

a plurality of circumferential ribs, and where the radial cross-section of the sealing cap adjacent the second end of the expandable body is the radial cross-section of one of the plurality of circumferential ribs adjacent the second end of the expandable body.

9. The sealing plug as claimed in claim 6, wherein the expandable body has a hardness less than a hardness of the sealing cap.

* * * * *